United States Patent [19]

Teramachi

[11] Patent Number: 4,903,386
[45] Date of Patent: Feb. 27, 1990

[54] METHOD OF MANUFACTURING A SPHERICAL BEARING

[76] Inventor: Hiroshi Teramachi, 2-34-8, Higashi-Tanagawa, Setagaya-Ku, Tokyo, Japan

[21] Appl. No.: 323,346

[22] Filed: Mar. 14, 1989

Related U.S. Application Data

[62] Division of Ser. No. 214,744, Jul. 1, 1988, Pat. No. 4,846,590.

[30] Foreign Application Priority Data

Jul. 7, 1987 [JP] Japan .................................. 62-167853

[51] Int. Cl.⁴ ............................................. B21D 53/10
[52] U.S. Cl. .................................. 29/898.06; 29/441.1; 29/458; 29/469.5; 29/898.15; 164/97; 264/242
[58] Field of Search ............... 384/206, 208, 213, 298, 384/300, 295, 296; 29/149.5 DP, 149.5 NM, 441.1, 458, 469.5; 264/242; 164/97, 98

[56] References Cited

U.S. PATENT DOCUMENTS

| | | | |
|---|---|---|---|
| 1,732,657 | 10/1929 | Picquerez | 29/149.5 NM X |
| 2,958,927 | 11/1960 | Kravais | 29/441.1 X |
| 3,068,053 | 12/1962 | Runton et al. | 384/298 |
| 3,068,552 | 12/1962 | Williams et al. | 29/441.1 X |
| 3,191,265 | 6/1965 | McCloskey | 29/441.1 X |
| 3,351,999 | 11/1967 | McCloskey | 29/441.1 X |
| 3,562,885 | 2/1971 | McCloskey | 29/441.1 X |
| 3,874,050 | 4/1975 | White | 29/149.5 NM X |
| 4,318,438 | 3/1982 | Ban et al. | 164/97 |
| 4,631,793 | 12/1986 | Shintaku et al. | 164/97 X |

FOREIGN PATENT DOCUMENTS 956201  4/1964  United Kingdom ....... 29/149.5 NM

Primary Examiner—Timothy V. Eley
Assistant Examiner—Frances Chin
Attorney, Agent, or Firm—Kenyon & Kenyon

[57] ABSTRACT

A spherical bearing comprises an outer ring and an inner ring located inside the outer ring to be slidable, the outer ring is prepared by casting molten metal around a resin-made sheet to be coated on the inner ring. A liner disposed between the inner and outer ring comprises a liner body and a metallic mesh member embedded in the liner body, and the molten metal is filled in meshes in the mesh member so as to partially bite the inner peripheral portion of the outer ring to achieve the firm engagement of the liner with the outer ring.

1 Claim, 4 Drawing Sheets

FIG. 5
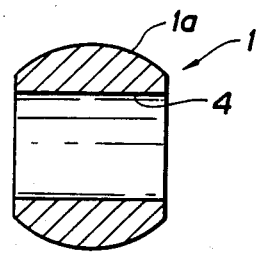
FIG. 6A  FIG. 6B
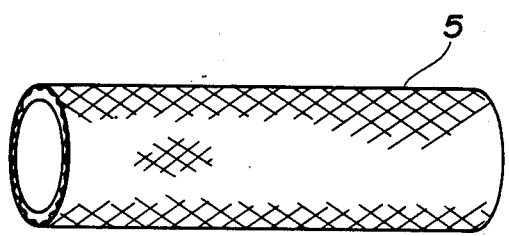 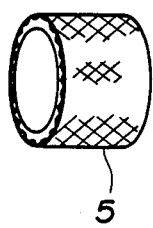
FIG. 7  FIG. 8
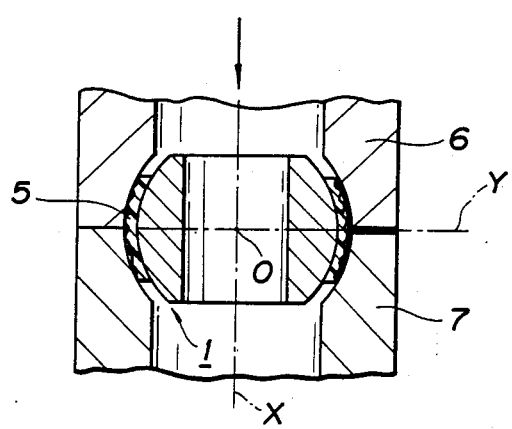 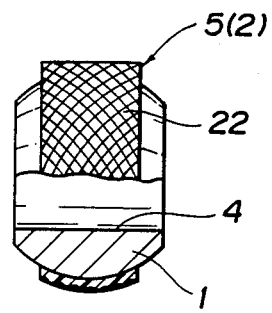

METHOD OF MANUFACTURING A SPHERICAL BEARING

This is a division of application Ser. No. 214,744 filed July 1, 1988, now U.S. Pat. No. 4,846,590.

BACKGROUND OF THE INVENTION

The present invention relates to a spherical bearing for use in, for instance, transmission and steering wheel portion of an automobile, and a link motion mechanism of various automation machines, and more particularly to an oilless spherical bearing and a method of production thereof.

Hitherto, as a spherical bearing of this type, for instance, one shown in FIG. 11 is known (refer to the Japanese Patent Publication No. 42569/1976). Referring to FIG. 11, an inner ring 100 has an outer peripheral surface formed spherically, and the inner ring 100 is slidably fitted with an outer ring 101 whose inner peripheral surface is similarly formed spherically. In addition, a liner 102 formed of fluoride resin or the like is interposed between the inner ring 100 and the outer ring 101 to realize an oilless spherical bearing.

As illustrated in FIG. 12, such a spherical bearing is arranged as follows. The surface of the inner ring 100 is coated with a self-lubricating thin plate 103 formed of a low-friction high-polymer material, and the thus prepared inner ring 100 is accommodated in a mold 104 like a core, the mold 104 having a configuration that matches with that of the outer ring 101. A low-melting-point alloy is cast into a cavity therebetween, which completes the formation of the outer ring 101 and, at the same time, the assembly. In addition, sliding surfaces are formed between an outer surface of the inner ring 100 and the above-described self-lubricating thin plate 103 secured to the outer ring 101 at the time of casting.

Furthermore, since the free rotation of the inner ring 100 is hampered as a result of the shrinkage of the outer ring 101 during cooling and hardening, the outer ring 101 is compressed in the axial direction after casting, as shown in FIG. 13, so that the outer ring 101 is subjected to slight plastic deformation in the form of a chevron in which a central part thereof is bent in terms of its vertical cross section, and a slight gap required is hence formed between the thin plate 103 and the inner ring 100.

In such a prior art, however, bonding between the self-lubricating thin plate 103 and the outer ring 101 is effected by fusing the surface of the thin plate 103, which is brought into contact with the molten metal during casting, to the inner surface of the outer ring 101 by means of heat thereof. However, the affinity between resin and metal is generally poor, the bonding strength is weak if they are simply fused to each other, and there is a possibility that the thin plate 103 may become exfoliated due to a shearing force acting on the bonded surfaces, causing the position of the thin plate 103 to be offset. When the position of the thin plate 103 is offset, the metal surface of the outer ring 101 is exposed, and the metallic portion is brought into direct contact with the inner ring 100, which results in increased sliding resistance and causes rattling due to the partial wear of the sliding surface.

In addition, since the liner 102 is formed of a resin, the compressive strength thereof is low, and has the possibility of becoming damaged if the compressive load applied to the inner ring 100 becomes large. Moreover, even if damage does not result, there is a problem in that crip deformation may occur, making it impossible to bear a large load.

Furthermore, since the fluoride-based resin has a small conductivity, the fluoride-based resin is unable to allow the heat generated by friction with the inner ring 100 during use to escape effectively, so that there has also been the problem of the sliding surface becoming overheated and seized.

Meanwhile, in production, the thin plate 103 is coated on the surface of the inner ring 103, but, during casting of the outer ring 101, it is necessary to prevent the molten metal from flowing to the side of the inner ring 100. Namely, if the molten metal enters between the thin plate 103 and the inner ring 100, the molten metal hardens, with the result that a metallic foreign substance is interposed between the thin plate 103 and the inner ring 100 and the surface of the inner ring 100 becomes worn by the metallic foreign substance during use. In addition, the thin plate 103 also becomes damaged by wearing powders, so that the characteristics of the bearing are lost.

This problem would be satisfied with a technique that the thin plate 103 is held in close contact with the outer surface of the inner ring 100 during casting, but since the outer surface of the inner ring 100 is spherically shaped, it has been difficult in terms of molding to hold the sheet-like thin pate 103 in close contact with such a spherical portion. For instance, even if the thin plate 103 is formed into a spherical shape in advance, if an attempt is made to insert the inner ring 100 into such a spherically formed one, the inner ring 100 cannot be inserted since its central portion is expanded. If an attempt is made to insert it forcedly, there has been the problem that the thin plate 103 becomes broken. In addition, if the thin plate 103 is formed into the shape of a strip and if the thin plate 103 is wound around the outer surface of the inner ring 100, and the both ends of the wound thin plate 103 are provisionally attached to each other by means of an adhesive tape, there has been the problem that the molten metal flows round to the side of the inner ring 103 from the seam of the thin plate 103.

On the other hand, in a conventional example, since a very small gap is formed between the thin plate 103 and the inner ring 100 by applying an axial external force to the shrunk outer ring 101, it has been impossible to form this small gap uniformly. In other words, the outer ring 101 has been bent into the chevron shape by an external force, the very small gap is large at the central portion of the inner peripheral surface of the outer ring 101 and is small at edge portions 101a, 101a. For that reason, the swinging resistance of the inner ring 100 becomes nonuniform, and the smooth movement of the inner ring 100 is hampered. In addition, since the gap is nonuniform, the edge portions of the thin plate 103 are partially brought into contact with the outer surface of the inner ring 100 when the load is applied. As a result, the contact area between the thin plate 103 and the inner ring 100 is narrowed, and a concentrated load is applied to the vicinity of the edge portions, making it impossible to bear a high load. In addition, there have also been such problems that partial wear is likely to occur at the edge portions, resulting in play. Furthermore, it has been unavoidable to increase the very small gap in order to prevent the partial contact between the thin plate 103 at the edge portions 101a, 101a and the inner ring 100, so that there has been another problem that this results in a weakness against an impact load as well as a large amount of play, possibly causing a delay in the transmission of a force in, for instance, a link mechanism.

SUMMARY OF THE INVENTION

Accordingly, an object of this invention is to substantially eliminate defects or drawbacks encountered to the conventional technique described above and to provide an improved spherical bearing capable of increasing the bonding strength between a liner and an outer ring, increasing the strength of the liner itself and making uniform a small gap between the liner and the inner ring.

Another object of this invention is to provide an improved spherical bearing which facilitates a molding process for forming the same, has a good heat conductivity and a long life and makes it possible to prevent molten metal from flowing round to the side of the inner ring.

A further object of this invention is to provide a method of manufacturing a spherical bearing of the superior characteristic features described above.

These and other objects can be achieved according to this invention in one aspect by providing a spherical bearing comprising an outer ring, an inner ring located inside the outer ring to be slidable, and a liner disposed between the outer and inner rings, the liner comprising a liner body made of resin and a metallic mesh member embedded in the liner body, the metallic mesh member partially biting an inner peripheral portion of the outer ring so as to achieve firm engagement of the liner with the outer ring.

In another aspect of this invention, there is provided a method of manufacturing a spherical bearing in which an inner ring is slidably fitted in an outer ring through a liner comprising the steps of coating an outer surface of the inner ring to be coated with a resin made sheet, embedding a metallic mesh member in the coated resin made sheet, disposing the inner ring in a mold, preparing a molten metal and casting the molten metal around the resin-made sheet coated on the inner ring to mold the outer ring, filling the molten metal in meshes of the mesh member so as to bond the resin-made sheet to the outer ring, and pressing the outer ring against an outer surface of the inner ring and spreading the same by applying a radially inwardly-oriented external force to the outer ring of a molding removed from the mold after cooling and hardening, thereby forming a very small gap between the resin-made sheet bonded to an inner periphery of the outer ring and the outer surface of the inner ring.

According to the spherical bearing of the character described above and the method of manufacturing the same, the liner is firmly bonded to the outer ring by means of the mesh member and is not exfoliated by frictional resistance or the like during use. In addition, the strength of the liner is reinforced by the metallic mesh member, and the mesh member functions as a core and permits molding into a desired shape. Furthermore, the frictional heat during use is allowed to escape through the mesh member, and the sliding surface of the inner ring is cooled effectively. Moreover, even if a resin portion of the liner becomes worn and the mesh member is exposed as a result, favorable self-lubricating function is maintained since the meshes of the mesh member are filled with the resin.

Meanwhile, since the sheet made of the resin is held in close contact with the outer surface of the inner ring due to the deformation of the mesh member before casting of the outer ring, the molten metal does not enter between the inner ring and the sheet. In addition, if the outer ring which has shrunk after cooling and hardening is spread by applying an external force thereto inwardly in the radial direction, the inner periphery of the outer ring is spread along the outer surface of the inner ring, and the mesh member bonded to the inner periphery of the outer ring expands by a portion in which the outer ring has been spread. Furthermore, as the mesh member is expanded, the resin portion of the resin-made sheet is also stretched, so that a uniform, very small gap is formed between the resin-made sheet and the outer surface of the inner ring over the entire periphery thereof.

The preferred embodiments of this invention will be described in detail hereunder with reference to the accompanying drawings.

BRIEF DESCRIPTION OF THE DRAWINGS

In the accompanying drawings:

FIG. 5 is a vertical cross-sectional view of an inner ring;

FIGS. 6A and 6B are views illustrating a resin-made sheet to be preprocessed;

FIG. 7 is a vertical cross-sectional view illustrating a mouth portion to be throttled of the resin-made sheet coated on the inner ring;

FIG. 8 is a vertical cross-sectional view of the inner ring for which the mouth-portion throttling process has been completed;

DESCRIPTION OF THE PREFERRED EMBODIMENTS

Figure 1:
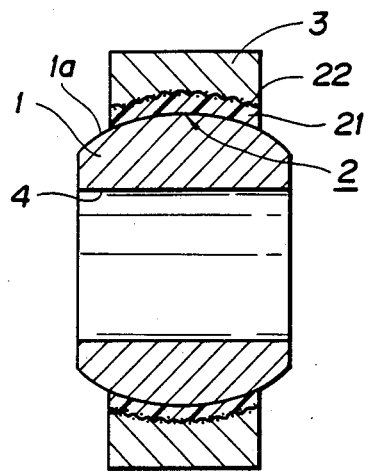
FIG. 1 is a vertical cross-sectional view of a spherical bearing in accordance with an embodiment of the present invention.
Figure 2:
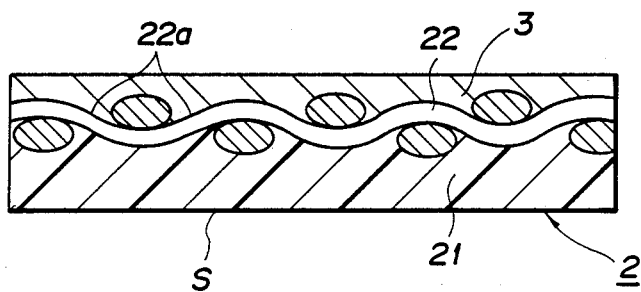
FIG. 2 is an enlarged cross-sectional view of a bonded portion between a liner and an outer ring both shown in FIG. 1.
Figure 3:
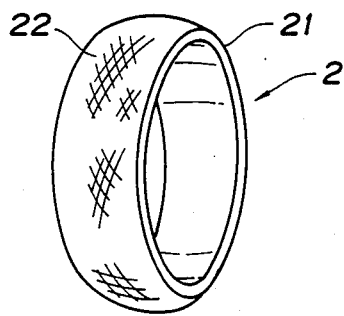
FIG. 3 is a perspective view of the liner taken out.
Figure 4:
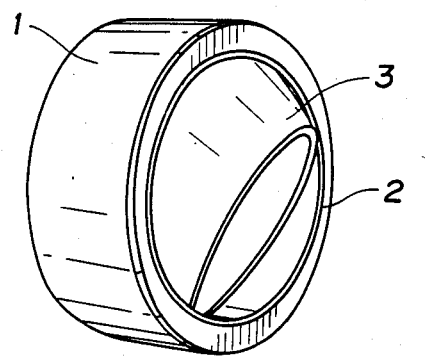
FIG. 4 is a schematic perspective view of the bearing shown in FIG. 1.

Hereafter, the present invention will be described on the basis of an embodiment illustrated in the accompanying drawings. FIGS. 1 to 4 illustrate a spherical bearing in accordance with an embodiment of the present invention. In the drawings, an inner ring 1 has an outer surface formed into the form of a spherical strip, and the inner ring 1 is slidably engaged with an inner periphery of an outer ring 3 via a liner 2. The inner ring 1 is spherically shaped, and a through hole 4 for mounting a journal therein is formed in the direction of a central axis thereof.

Meanwhile, the outer ring 3 has a configuration of a flat cylinder, and its inner peripheral surface is formed into a spherical shape whose diameter is slightly larger than that of the above-described inner ring 1.

In addition, the liner 2 is a cylindrical member which is expanded into the shape of a spherical strip matching with the configuration of the inner periphery of the above-described outer ring 3, and is constituted by a liner body 21 made of resin and a metallic mesh member 22 embedded in this liner body 21. As the liner body 21, a resin which has a low coefficient of friction and excels in frictional resistance and also excels in heat resistance is employed. In this embodiment, a fluoride-based resin such as tetrafluoroethylene resin is used, which has a high load resistance and a large thermal conductivity in addition to the aforementioned characteristics, and its coefficient of thermal expansion is small. In addition, as the mesh member 22, bronze, stainless steel, or the like which is flexible and rigid is used.

As for a state in which the mesh member 22 is embedded, the mesh member 22 is embedded in such a manner that a sliding surface side S which is brought into contact with the inner ring 1 has a thick resin portion, while the side of its surface contacting the outer ring 3 is thin.

Meanwhile, the inner surface of the outer ring 3 is joined to the liner 2 in a state in which the inner surface bites into the inside of the meshes 22a of the aforementioned mesh member 22.

As for the mesh member 22, wires constituting the same are welded together at a seam, and the meshes do not become loose even if a high load (4,000 kg/cm² or thereabout) is applied thereto, and the mesh member 22 firmly binds and holds the resin layer to prevent the deformation or flow thereof. In addition, the mesh member 22 has a property of speedily radiating heat which is generated on the surface of the bearing.

A method of producing the spherical bearing having the above-described arrangement will be described with reference to FIGS. 5 to 10.

First, the inner ring 1 is produced, as shown in FIG. 5. The inner ring 1 is finished after quenching, and a spherical portion 1a is finished by lapping.

The process of coating with a sheet 5 made of a resin will be described with reference to FIGS. 5 to 8. First, the resin-made sheet 5 is formed in advance into a cylindrical shape, as shown in FIG. 6A. Next, the resin-made sheet 5 is cut in round slices at predetermined widths by a portion to be coated on the inner ring 1, and this portion is applied on the outer surface of the inner ring 1. Further, as shown in FIG. 7, both end portions of the sheet 5 are throttled by using press dies 6, 7, and, as shown in FIG. 8, the sheet 5 is made to be closely adhered to the outer surface of the inner ring 1 over the entire periphery thereof.

Figure 9:
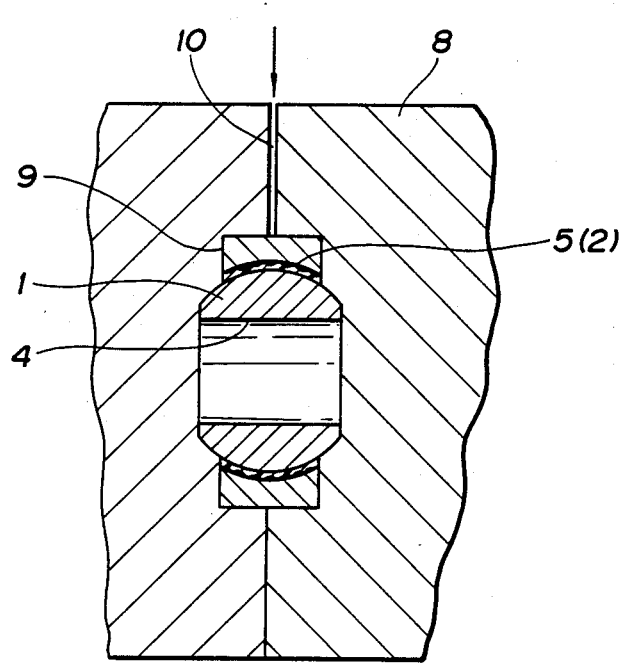
FIG. 9 is a schematic vertical cross-sectional view of a mold in a casting process.

Furtherore, as shown in FIG. 9, the inner ring 1 is inserted into a mold 8 and die casting is effected. The mold 8 is a split type to be splittable into two parts along a perpendicular line Y which passes through a central point O of the inner ring 1 and is perpendicular to a central axis X thereof. Inside the mold 8, an annular empty chamber 9 for forming the outer ring 3 is formed around the inner ring 1, and the outer ring 3 is formed as molten metal is poured from a casting channel 10 which communicates with this empty chamber 9.

As for the molding material of the outer ring 3, zinc (melting point: 400° C.), aluminum (melting point: 600° C.), or the like is used. It should be noted that a specific alloy for a bearing may not be used as the material of the outer ring 3.

According to the present invention, since the resin-made sheet 5 is held in close contact with the outer surface of the inner ring 1 in a preprocessing process, it is possible to completely prevent the molten metal from flowing round from the end portions of the sheet 5 to the side of the inner ring 1 during casting.

Owing to the heat of the molten metal poured, the contact surfaces of the resin sheet 5 and the molten material are fused by the heat, and the metal enters the meshes 22a of the mesh member 22, with the result that the sheet is firmly bonded to the inner peripheral surface of the outer ring 3.

Subsequently, after the internal molten material has been cooled and hardened, the mold is opened to take out the molded product.

Figure 10:
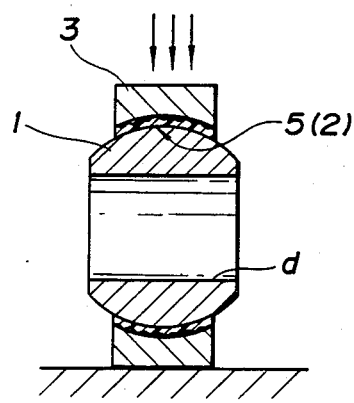
FIG. 10 is a schematic vertical cross-sectional view of the bearing in a gap forming process after casting.
Figure 11:
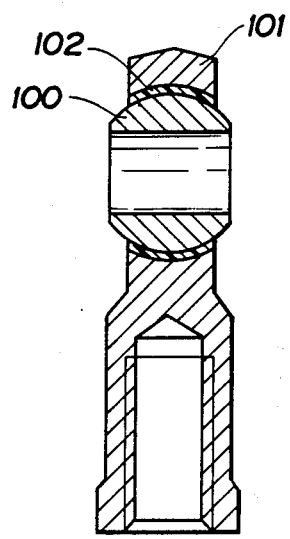
FIG. 11 is a vertical cross-sectional view of a conventional spherical bearing.
Figure 12:
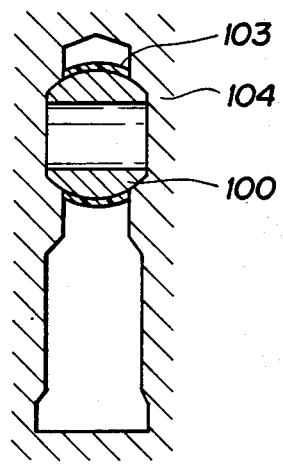
FIG. 12 is a vertical cross-sectional view of the mold in a process of casting the outer ring of the bearing of FIG. 11.
Figure 13:
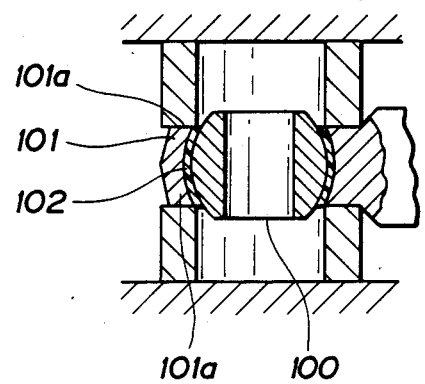
FIG. 13 is a schematic vertical cross-sectional view of the apparatus illustrating a process of forming a very small gap after the casting of the outer ring of FIG. 12.

Furthermore, after the molded product is removed from the mold 8, the shrunk outer ring 3 is spread by applying an external force to the outer periphery thereof inwardly in the radial direction, as shown in FIG. 10, so as to form a very small gap d between the sheet 5 and the outer surface of the inner ring 1. Namely, the inner surface of the outer ring 3 is pressed against the outer surface of the inner ring 1 by the external force, so that the inner surface of the outer ring 3 is spread by conforming to the outer spherical surface of the inner ring 1. The mesh member 22 bonded to the inner peripheral surface of the outer ring 3 is expanded by the portion in which the outer ring 3 has spread, and the resin portion of the resin-made sheet 5 is also spread by the spreading of the mesh member 22, so that the very small gap d with a uniform width is formed between the resin-made sheet 5 and the outer surface of the inner ring 1 over the entire periphery thereof.

Finally, the outer peripheral surface and the both end surfaces of the outer ring 3 are subjected to cutting to remove flashes and the like, and surface finishing is provided, thereby completing the processing.

According to the thus formed spherical bearing, since the metal for the outer ring 3 bites into the meshes 22a of the mesh member 22 of the liner 2, the resin-made sheet 5 does not become offset by the pressure or movement of the pressure molten metal, and the liner 2 can be formed at a predetermined position of the outer ring 3 with a high degree of accuracy. In addition, since the liner 2 is thus bonded firmly, there is no possibility that the liner 2 is offset with respect to the outer ring 3 or removed by a shearing force acting on the bonding portion when the spherical bearing is used under high load and at high speed.

Meanwhile, even if a large load is applied from the inner ring 1 to the liner 2, since the liner 2 is reinforced by the metallic mesh member 22, the liner 2 is not crushed by a compressive load. In addition, the creep deformation of the resin portion is prevented by the location of the mesh member 22.

The frictional heat generated on the bearing surface during use is allowed to escape to the outer ring through the metallic mesh member 22, and the sliding portion is cooled efficiently. Furthermore, even if the resin portion of the liner 2 becomes worn and the mesh member 22 is exposed as a result, since the meshes 22a are filled with the resin, the resin powders loaded in the meshes 22a are the mesh member, the bonding strength can be made far stronger than a case where a resin-made thin plate is directly fused to the outer ring, as in the conventional case, and the reliability can be enhanced. In addition, since the liner itself is reinforced by the mesh member, its strength is high, and its load resisting capability can be improved. Furthermore, the heat generated on the bearing surface during use is transmitted speedily from the mesh member to the outer ring, and the cooling efficiency of the bearing can be enhanced. Moreover, even if the resin portion of the liner becomes worn, the resin powders loaded in the meshes of the mesh member are spread in the form of a film over the entire sliding surface as a lubricant, so that the lubricating performance can be maintained and a long life can be ensured.

Meanwhile, in the present invention, since a resin-made sheet is applied to the spherical surface of the inner ring in a closely adhered state prior to the casting of the outer ring, it is possible to completely prevent the molten metal from flowing round to the side of the inner ring during the casting of the outer ring, it is possible to protect the sliding surfaces of the liner and the inner ring, and the reliability of the product can be improved. In addition, as an external force is applied to the outer ring inwardly in the radial direction, it is possible to spread in the form of a film as a lubricant over the entire sliding surface during the rotation of the inner ring 1, so that a favorable self-lubricating function is maintained.

Furthermore, since the gap d between the liner 2 and the inner ring 1 is formed by compressing the outer ring 3 inwardly in the radial direction and by spreading the outer ring 3 by conforming with the outer peripheral surface of the inner ring 1, a uniform size is obtained over the entire sliding surface. Accordingly smooth movement of the inner ring 1 is ensured, and since the contacting area is large, it is possible to bear a high load, and the load resisting capability is kept to be high. In addition, partial wear does not occur, and it is hence possible to prevent rattling or the like resulting from the partial wear.

It should be noted that, although, in the present invention, a description has been given of a spherical bearing having a cylindrical outer ring, the present invention is also applicable to one having a rod, as in the case of a conventional example, i.e., a rod end bearing.

The present invention is constituted by the above-described arrangement and operation, and since a liner is bonded to an outer ring by using a liner with a metallic mesh member embedded therein and by embedding the inner peripheral surface of the outer ring in the meshes of uniformly form the very small gap formed between the resin-made sheet and the inner ring, so that smooth movement of the inner ring can be ensured. Also, since the inner ring is not brought into partial contact with the liner, it is possible to provide large contacting areas, making it possible to increase the load resisting capability and to prevent the occurrence of partial wear. In addition, since the very small gap can be made uniform, the size of the gap can be made as small as possible. This results in improved shock resistance and smaller play between the inner ring and the liner, and it is possible to improve the response characteristics of transmission of a force when the spherical bearing is used in, for instance, a link mechanism. Thus, the present invention makes it possible to obtain various effects.

What is claimed is:

1. A method of manufacturing a spherical bearing in which an inner ring is slidably fitted in an outer ring through a liner, comprising the steps of:

coating an outer surface of the inner ring with a resin made sheet;

embedding a metallic mesh member in the coated resin made sheet;

disposing the inner ring in a mold;

preparing a molten metal and casting the molten metal around said resin-made sheet coated on said inner ring to mold the outer ring;

filling the molten metal in meshes of said mesh member so as to bond the resin-made sheet to the outer ring; and pressing said outer ring against an outer surface of said inner ring and spreading the same by applying a radially inwardly-oriented external force to said outer ring of a molding removed from said mold after cooling and hardening, thereby forming a very small gap between said resin-made sheet bonded to an inner periphery of said outer ring and said outer surface of said inner ring.

* * * * *